(12) United States Patent
Yoon et al.

(10) Patent No.: US 11,459,430 B2
(45) Date of Patent: Oct. 4, 2022

(54) METHOD FOR PREPARING SUPERABSORBENT POLYMER, AND SUPERABSORBENT POLYMER

(71) Applicant: LG Chem, Ltd., Seoul (KR)

(72) Inventors: Ki Youl Yoon, Daejeon (KR); Hyo Sook Joo, Daejeon (KR); Gi Cheul Kim, Daejeon (KR); Hyeon Choi, Daejeon (KR); Ju Eun Kim, Daejeon (KR)

(73) Assignee: LG Chem, Ltd.

( * ) Notice: Subject to any disclaimer, the term of this patent is extended or adjusted under 35 U.S.C. 154(b) by 620 days.

(21) Appl. No.: 16/083,235

(22) PCT Filed: Jun. 21, 2017

(86) PCT No.: PCT/KR2017/006543
§ 371 (c)(1),
(2) Date: Sep. 7, 2018

(87) PCT Pub. No.: WO2017/222307
PCT Pub. Date: Dec. 28, 2017

(65) Prior Publication Data
US 2019/0077927 A1   Mar. 14, 2019

(30) Foreign Application Priority Data

Jun. 21, 2016 (KR) .......................... 10-2016-0077371
Jun. 20, 2017 (KR) .......................... 10-2017-0077970

(51) Int. Cl.
| | | |
|---|---|---|
| C08J 3/24 | (2006.01) | |
| C08K 7/00 | (2006.01) | |
| C08K 9/04 | (2006.01) | |
| C08F 20/66 | (2006.01) | |
| C08F 6/00 | (2006.01) | |
| C08F 220/06 | (2006.01) | |
| C08L 33/02 | (2006.01) | |
| C08F 2/44 | (2006.01) | |
| C08F 292/00 | (2006.01) | |
| C08J 3/12 | (2006.01) | |
| B01J 20/26 | (2006.01) | |
| C08K 3/34 | (2006.01) | |

(52) U.S. Cl.
CPC ............ *C08J 3/245* (2013.01); *B01J 20/267* (2013.01); *C08F 2/44* (2013.01); *C08F 6/008* (2013.01); *C08F 20/66* (2013.01); *C08F 220/06* (2013.01); *C08F 292/00* (2013.01); *C08J 3/12* (2013.01); *C08K 3/346* (2013.01); *C08K 7/00* (2013.01); *C08K 9/04* (2013.01); *C08L 33/02* (2013.01); *B01J 2220/68* (2013.01); *C08J 2333/02* (2013.01); *C08K 2201/005* (2013.01)

(58) Field of Classification Search
CPC .......... C08J 3/245; C08J 3/12; C08J 2333/02; C08K 3/346; C08K 9/04; C08K 2201/005; C08K 7/00; C08F 20/66; B01J 20/267; B01J 2220/68
USPC ........................................................ 525/329.9
See application file for complete search history.

(56) References Cited

U.S. PATENT DOCUMENTS

| | | |
|---|---|---|
| 6,387,495 B1 | 5/2002 | Reeves et al. |
| 2004/0214946 A1 | 10/2004 | Smith et al. |
| 2005/0239942 A1 | 10/2005 | Herfert et al. |
| 2005/0245393 A1 | 11/2005 | Herfert et al. |
| 2006/0036222 A1 | 2/2006 | Cohen et al. |
| 2010/0057026 A1 | 3/2010 | Cohen et al. |
| 2010/0100066 A1* | 4/2010 | Azad .................. A61L 15/60 604/372 |
| 2010/0210746 A1 | 8/2010 | Gustafson et al. |
| 2012/0035294 A1 | 2/2012 | Kim et al. |
| 2012/0157622 A1 | 6/2012 | Lindner et al. |
| 2012/0157623 A1 | 6/2012 | Lindner et al. |
| 2016/0316759 A1 | 11/2016 | Bougoure et al. |
| 2017/0361305 A1 | 12/2017 | Kim et al. |

FOREIGN PATENT DOCUMENTS

| | | |
|---|---|---|
| CN | 1187099 C | 2/2005 |
| CN | 1678356 A | 10/2005 |
| CN | 1678357 A | 10/2005 |
| JP | 5041807 B2 | 10/2012 |
| JP | 2014504317 A | 2/2014 |
| JP | 2015147932 A | 8/2015 |
| JP | 5897598 B2 | 3/2016 |
| KR | 20050036974 A | 4/2005 |
| KR | 20050036975 A | 4/2005 |
| KR | 10-1170864 B1 | 8/2012 |

(Continued)

OTHER PUBLICATIONS

Odian, George, "Principle of Polymerization", Second Edition, the City University of New Ork, Staten Island, New York, Wiley 1981, p. 203.

(Continued)

*Primary Examiner* — Hui H Chin (74) *Attorney, Agent, or Firm* — Lerner, David, Littenberg, Krumholz & Mentlik, LLP (57) ABSTRACT

The present invention relates to a method for preparing superabsorbent polymer that introduces a plate type and rod-shaped clay additive in the superabsorbent polymer, and thus exhibits basic properties of a superabsorbent polymer equivalent to or much better than the existing superabsorbent polymer through multi-crosslinking, and particularly, can improve absorbency under pressure (AUP), and a superabsorbent polymer obtained thereby.

16 Claims, 2 Drawing Sheets

(56) References Cited

FOREIGN PATENT DOCUMENTS

| KR | 20130018350 A | 2/2013 |
|---|---|---|
| KR | 20160016645 A | 2/2016 |
| KR | 20160016695 A | 2/2016 |
| WO | 2015091967 A1 | 6/2015 |
| WO | 2015116965 A1 | 8/2015 |

OTHER PUBLICATIONS

Palkova, H. et al., "The Effect of Acid Treatment on the Structure and Surface Acidity of Tetraalkylammonium-Montmorillonites", Journal of colloid and interface science, [Electronic publishing] Dec. 19, 2012, vol. 395, pp. 166-175.

Schwalm, Reinhold, "UV Coatings Basics Recent Developments and New Applications", Elsevier Science, Dec. 21, 2006, p. 115.

Search report from International Application No. PCT/KR2017/006543, dated Sep. 25, 2017.

Seetapan, N. et al., "Superabsorbent Polymer Nanocomposites with Surfuctant- or Acid-modified Ca-montmorillonite: Synthesis and Water Absorbency", Journal of Polymer Research, [Electronic Publishing] Feb. 2015, vol. 22, No. 3, article No. 31, internal pp. 1-8.

Seyidoglu, T. et al., "Production of Modified Clays and Their Use in Polypropylene-based Nanocomposites", Journal of Applied Polymer Science, [Electronic publishing] May 19, 2012, vol. 127, No. 2, pp. 1257-1267.

Zawrah, M. F. et al., "Effect of Surfactant Types and Their Concentration on the Structural Characteristics of Nanoclay", Spectrochimica Acta Part A: Molecular and Biomolecular Spectroscopy, [Electronic publishing] Nov. 20, 2013, vol. 122, pp. 616-623.

Chinese Search Report for Application No. 201780021688.3, dated Jul. 31, 2020, pp. 1-3.

Zhang, Nanocomposites Handbook, China Petrochemical Press, Jul. 2005, pp. 170-171 (English abstract attached).

* cited by examiner

METHOD FOR PREPARING SUPERABSORBENT POLYMER, AND SUPERABSORBENT POLYMER

CROSS-REFERENCE TO RELATED APPLICATIONS

This application is a national phase entry under 35 U.S.C. § 371 of International Application No. PCT/KR2017/006543, filed on Jun. 21, 2017, which claims the benefit of priority to Korean Patent Application No. 10-2016-0077371 filed on Jun. 21, 2016 and Korean Patent Application No. 10-2017-0077970 filed on Jun. 20, 2017, the disclosures of which are incorporated herein by reference.

TECHNICAL FIELD

The present invention relates to a method for preparing a superabsorbent polymer that exhibits basic properties required of a superabsorbent polymer and that can provide improved absorbency under pressure (AUP).

BACKGROUND OF THE INVENTION

A super absorbent polymer (SAP) is a synthetic polymer material that can absorb moisture at 500 to 1000 times its own weight, and is also called a super absorbency material (SAM), an absorbent gel material (AGM), etc. according to developing companies. The superabsorbent polymer began to be commercialized as sanitary items, and currently, it is being widely used for hygienic goods such as disposable diapers and so on, a water-holding material for soil, a water stop material for civil engineering and architecture, sheets for raising seedlings, freshness preservatives in the field of food circulation, a fomentation material, etc.

In most cases, such a superabsorbent polymer is being widely used in the field of hygienic goods such as diapers, sanitary pads, etc. For such use, it is required to exhibit high absorption of moisture, etc., and the absorbed moisture should not escape even under external pressure, and in addition, it should properly maintain its shape even when it absorbs water and the volume is expanded (swollen), thus exhibiting excellent absorption.

Meanwhile, in order to improve the basic properties of a superabsorbent polymer such as CRC (centrifuge retention capacity) and AUP (absorbency under pressure), studies on the introduction of nanoclay particles are actively progressing. For example, nanoclay is added before polymerization so as to improve the elasticity and flexibility of the polymer absorbing water through a strong bond between the polymer and the nanoclay.

However, the nanoclay added in the above-described method is non-uniformly distributed in the polymer in the form of agglomerated particles, due to a problem of dispersion stability in an acrylic acid-containing polymerization solution, and thus improvement in the basic properties of the polymer cannot be expected.

In order to solve the problem, improvement in dispersibility in an acidic polymerization solution including polymerizable carboxylate/carboxylic acid is being sought through dispersant treatment or surface modification of the basal surface of nanoclay or an edge silanol group of clay.

However, in the case of nanoclay, there is a problem in that a relatively large quantity should be introduced as an inorganic filler due to the large specific surface area and small size of the clay.

Further, in the case of surface modification of the edge silanol group, there is a problem in that surface treatment is not uniform. In this case, when compatibility with an acidic polymerization solution is low, dispersion stability of the composition may be lowered, and problems in terms of polymer properties may be caused by agglomeration of nanoclay in the final product.

DISCLOSURE

Technical Problem

It is an object of the present invention to provide a method for preparing a superabsorbent polymer that introduces a plate type and rod-shaped clay additive into the superabsorbent polymer, and thereby exhibits basic properties that are equivalent to or better than the existing superabsorbent polymer through multi-crosslinking, and particularly, can improve absorbency under pressure (AUP).

It is another object of the present invention to provide a superabsorbent polymer obtained by the method.

Technical Solution

The present invention provides a method for preparing a superabsorbent polymer including the steps of:

mixing water-soluble ethylenically unsaturated monomers having acid groups of which at least a part are neutralized, an internal crosslinking agent, a polymerization initiator, and additives to prepare a monomer composition;

polymerizing the monomer composition to form a hydrogel polymer including a multi-crosslinked polymer; and drying, grinding, and sieving the hydrogel polymer to form a base polymer powder, wherein the additives include a plate type and rod-shaped clay that is modified by an amine-based organic compound and has an amine group introduced on the surface thereof.

The content of the amine-based organic compound may be 5 to 50 parts by weight, based on 100 parts by weight of the clay before being modified.

As the amine-based compound, a quaternary amine compound represented by the following Chemical Formula 1 may be used.

[Chemical Formula 1]

In Chemical Formula 1, R, R', R", and R'" are each independently a C5-24 alkyl group, aryl group, or aralkyl group, which may optionally include a P, O, S, or N heteroatom, and X is a halogen atom or an alkyl sulfate.

The plate type and rod-shaped clay may include one or more nanoparticles selected from the group consisting of montmorillonite, saponite, nontronite, laponite, beidelite, hectorite, vermiculite, magadiite, kaolin, serpentine, and mica.

The plate type and rod-shaped clay may include a plate type and rod-shaped modified clay having an average size of 0.025 to 10 μm. In the monomer composition, the content of the additives may be 0.01 to 5 parts by weight, based on 100 parts by weight of the superabsorbent polymer.

The method may further include a step of heat treating the base polymer powder to progress surface crosslinking in the presence of a surface crosslinking solution, after the step of forming the base polymer powder.

The water-soluble ethylenically unsaturated monomers may include one or more selected from the group consisting of anionic monomers and salts thereof such as acrylic acid, methacrylic acid, maleic anhydride, fumaric acid, crotonic acid, itaconic acid, 2-acryloylethane sulfonic acid, 2-methacryloylethane sulfonic acid, 2-(meth)acryloylpropane sulfonic acid, and 2-(meth)acrylamide-2-methyl propane sulfonic acid; non-ionic hydrophilic group-containing monomers such as (meth)acrylamide, N-substituted (meth) acrylate, 2-hydroxyethyl (meth)acrylate, 2-hydroxypropyl (meth)acrylate, methoxy polyethylene glycol (meth)acrylate, and polyethylene glycol (meth)acrylate; and amino group-containing unsaturated monomers such as (N,N)-dimethylaminoethyl (meth)acrylate, (N,N)-dimethylaminopropyl (meth)acrylamide, and quaternary products thereof.

The internal crosslinking agent may include one or more selected from the group consisting of a C8-12 bis(meth)acrylamide, a poly(meth)acrylate of a C2-10 polyol, and a poly(meth)allylether of a C2-10 polyol.

It is preferable that the base polymer powder is ground and sieved to a particle diameter of 150 to 850 μm.

The present invention also provides a superabsorbent polymer including a crosslinked polymer of
water-soluble ethylenically unsaturated monomers having acid groups of which at least a part are neutralized, and
plate type and rod-shaped clay that is modified by an amine-based organic compound and has an amine group introduced on the surface thereof.

The superabsorbent polymer may have centrifuge retention capacity (CRC) to a saline solution (0.9 wt % sodium chloride aqueous solution) for 30 minutes of 35 to 40 g/g, and a particle diameter of 150 to 850 μm.

Further, the superabsorbent polymer may have AUP of 22 to 30 g/g.

The plate type and rod-shaped clay may include one or more nanoparticles selected from the group consisting of montmorillonite, saponite, nontronite, laponite, beidelite, hectorite, vermiculite, magadiite, kaolin, serpentine, and mica.

The water-soluble ethylenically unsaturated monomers may include one or more selected from the group consisting of anionic monomers and salts thereof such as acrylic acid, methacrylic acid, maleic anhydride, fumaric acid, crotonic acid, itaconic acid, 2-acryloylethane sulfonic acid, 2-methacryloylethane sulfonic acid, 2-(meth)acryloylpropane sulfonic acid, and 2-(meth)acrylamide-2-methyl propane sulfonic acid; non-ionic hydrophilic group-containing monomers such as (meth)acrylamide, N-substituted (meth) acrylate, 2-hydroxyethyl (meth)acrylate, 2-hydroxypropyl (meth)acrylate, methoxy polyethylene glycol (meth)acrylate, and polyethylene glycol (meth)acrylate; and amino group-containing unsaturated monomers such as (N,N)-dimethylaminoethyl (meth)acrylate, (N,N)-dimethylaminopropyl (meth)acrylamide, and quaternary products thereof.

Advantageous Effects

The present invention provides a method for preparing a superabsorbent polymer that can improve basic properties thereof, and can simultaneously improve gel strength compared to the existing superabsorbent polymer.

That is, according to the present invention, by broadening the interlayer interval of layered clay with an amine-based compound, the clay has plate and rod structures, and by introducing the clay as an additive during the preparation of the superabsorbent polymer, a superabsorbent polymer that not only has excellent basic absorption properties such as centrifuge retention capacity, etc., but also has significantly improved absorbency under pressure (AUP), and a method for preparing the same, are provided.

DETAILED DESCRIPTION OF THE EMBODIMENTS

Hereinafter, the present invention will be explained in more detail. The terms or words used in the specification and claims should not be interpreted imitatively with common or dictionary meanings, but should be interpreted with meanings and concepts corresponding to the technical idea of the present invention, based on the principle that the inventor can appropriately define the concepts of terms so as to explain one's own invention in the best way.

Further, the meaning of the term "include" used in the specification embodies specific characteristics, areas, essences, steps, actions, elements, and/or components, and does not exclude existence or addition of other specific characteristics, areas, essences, steps, actions, elements, and/or components.

According to one embodiment of the present invention, a method for preparing a superabsorbent polymer including the steps of: mixing water-soluble ethylenically unsaturated monomers having acid groups of which at least a part are neutralized, an internal crosslinking agent, a polymerization initiator, and additives to prepare a monomer composition; polymerizing the monomer composition to form a hydrogel polymer including a multi-crosslinked polymer; and drying, grinding, and sieving the hydrogel polymer to form a base polymer powder, wherein the additives include plate type and rod-shaped clay that is modified by an amine-based organic compound and has an amine group introduced on the surface thereof, is provided.

As used herein, the "multi-crosslinked polymer" includes the polymerized state of water-soluble ethylenically unsaturated monomers, and it may include a structure wherein the functional groups of monomers and the functional groups derived from plate type and rod-shaped clay used as an additive are randomly chemically crosslinked. Further, the "multi-crosslinked polymer" may include those of all moisture content or particle diameter ranges. Among the crosslinked polymers, the crosslinked polymer before being dried after polymerization with a moisture content of about 40 wt % or more may be referred to as hydrogel polymer. The "base polymer" or "base polymer powder" means the crosslinked polymer made in the form of powder by drying and grinding. The "superabsorbent polymer" means the crosslinked polymer or base polymer itself according to the context, or it is used to include the crosslinked polymer or base polymer made appropriate for the productization through additional processes, for example, surface crosslinking, powder reassembly, drying, grinding, sieving, etc.

Specifically, the present invention is characterized in that plate type and rod-shaped clay is introduced to form multi-crosslinking in the superabsorbent polymer so as to improve the basic properties of the superabsorbent polymer such as CRC (centrifuge retention capacity) and AUP (absorbency under pressure).

That is, it is difficult for clay made of large particles to achieve uniform exfoliation and dispersion in a solvent including water, due to strong interaction between silicate layers. However, in the case of plate type and rod-shaped clay wherein the interlayer interval is broadened by an organic substance, after polymerization of, the superabsorbent polymer, multi-crosslinking is generated by the structure effect of the clay in the superabsorbent polymer. Thereby, the present invention can improve basic properties of the superabsorbent polymer and gel strength, compared to the case of using a common platelet clay.

Thus, the present invention can improve basic properties and effectively increase absorbency under pressure (AUP) of the superabsorbent polymer through multi-crosslinking with the superabsorbent polymer, by introducing plate type and rod-shaped clay as an additive into an acidic polymerization solution for preparing the superabsorbent polymer.

Figure 1:
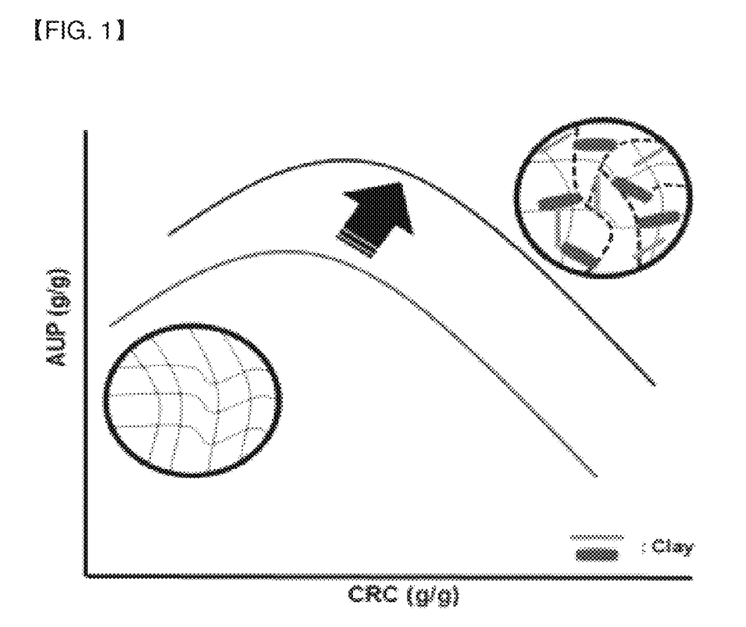
FIG. 1 comparatively shows the results of AUP to CRC of a common superabsorbent polymer and a superabsorbent polymer according to the present invention.

FIG. 1 comparatively shows the results of AUP to CRC of a common superabsorbent polymer and a superabsorbent polymer according to the present invention.

As shown in FIG. 1, in the superabsorbent polymer of the present invention, clay that is modified so as to have plate and rod structures forms multi-crosslinking in the polymer, thus improving AUP of the superabsorbent polymer.

Particularly, the plate type and rod-shaped clay used as an additive in the present invention has higher AUP than common platelet clay.

Such plate type and rod-shaped clay of the present invention may have both plate and rod structures because the interlayer interval of platelet clay is broadened by a specific amine-based organic compound. Further, the plate type and rod-shaped clay may have a hydroxyl group formed on the surface or edge as a functional group, besides the amine group introduced on the surface thereof.

The amount of the amine-based organic compound used to broaden the interlayer interval of the clay in the present invention may be 5 to 50 parts by weight, based on 100 parts by weight of the clay before modification. If the amount of is less than 5 parts by weight, it may be difficult to sufficiently broaden the interlayer interval of the clay, and if the amount is greater than 50 parts by weight, the properties of the SAP may be deteriorated due to surplus organic substances in the acid neutralized solution.

As the amine-based organic compound, a cationic surfactant may be used. Preferably, as the amine-based organic compound, a quaternary amine compound represented by the following Chemical Formula 1 may be used.

[Chemical Formula 1]

In Chemical Formula 1, R, R', R", and R'" are each independently a C5-24 alkyl group, aryl group, or aralkyl group, which may optionally include P, O, S, or N heteroatoms, and X is a halogen atom or an alkyl sulfate.

The modified clay used in the present invention may be prepared by the following method, or commercialized clay having a similar shape may be commercially acquired and used.

As one example of the preparation method of modified clay, platelet nanoclay is dispersed in a solvent, an amine-based organic compound is added, and stirring is progressed at a temperature of 40 to 50° C. for 12 to 24 hours. Thereafter, the solvent is removed from the stirred solution, and washing and drying may produce plate type and rod-shaped clay. Here, as the solvent, water or a water-soluble solvent may be used, and examples of the water-soluble solvent may include alcohol, acetone, etc.

The average size of the plate type and rod-shaped clay used in the present invention may be 0.025 to 10 μm, 0.1 to 10 μm, or 0.5 to 5 μm. If the size of the plate type and rod-shaped clay is less than 0.025 μm, the improvement in gel strength basically required of a superabsorbent polymer may be slight, and there is a limit to the improvement in basic properties, and if the size of the clay is greater than 10 μm, due to the strong interlayer attraction of the clay, it may be difficult to achieve uniform dispersion, and exfoliation by organic substance may also be difficult. The average size of the plate type and rod-shaped clay additive may mean to include the diameter of clay crystal particle, and if it is 0.1 to 10 μm, or 0.5 to 5 μm, basic properties required of the superabsorbent polymer may be further improved.

Meanwhile, the clay used for modification in the present invention may include nanoparticles having a silicate layered structure. As the clay, although not specifically limited, montmorillonite, saponite, nontronite, laponite, beidelite, hectorite, vermiculite, magadiite, kaolin, serpentine, mica, etc. may be used, and they may be modified by an amine-based organic compound, thereby including a rod structure.

Thus, the plate type and rod-shaped clay may include one or more nanoparticles selected from the group consisting of montmorillonite, saponite, nontronite, laponite, beidelite, hectorite, vermiculite, magadiite, kaolin, serpentine, and mica.

Hereinafter, the preparation method of a superabsorbent polymer according to one embodiment will be explained in more detail according to each step.

First, in the preparation method of one embodiment, a step of mixing water-soluble ethylenically unsaturated monomers having acid groups of which at least a part are neutralized, an internal crosslinking agent, a polymerization initiator, and additives to prepare a monomer composition is conducted.

In the monomer composition, the additive includes plate type and rod-shaped clay that is modified by an amine-based organic compound and has an amine group introduced on the surface thereof, as explained above. The modified nanoclay may act as a filler providing a space between the crosslinked polymer, thereby improving basic properties and absorbency under pressure (AUP).

In the monomer composition, the amount of the additives used may be about 0.01 to 5 parts by weight, preferably about 0.03 to 0.3 parts by weight or 0.03 to 0.1 parts by weight, based on 100 parts by weight of the ethylenically unsaturated monomers. If the amount of the additives is less than 0.01 parts by weight, the effect obtained by the addition of the inorganic substance may be slight, and if the amount is greater than 5 parts by weight, solubility and photopolymerization crosslinking may be adversely influenced.

As the monomers, water-soluble ethylenically unsaturated monomers or salts thereof known to be usable for the preparation of a superabsorbent polymer may be used without specific limitations.

In the superabsorbent polymer, the water-soluble ethylenically unsaturated monomers may include one or more selected from the group consisting of anionic monomers and salts thereof such as acrylic acid, methacrylic acid, maleic anhydride, fumaric acid, crotonic acid, itaconic acid, 2-acryloylethane sulfonic acid, 2-methacryloylethane sulfonic acid, 2-(meth)acryloylpropane sulfonic acid, and 2-(meth)acrylamide-2-methyl propane sulfonic acid; non-ionic hydrophilic group-containing monomers such as (meth)acrylamide, N-substituted (meth)acrylate, 2-hydroxyethyl (meth)acrylate, 2-hydroxypropyl (meth)acrylate, methoxy polyethylene glycol (meth)acrylate, and polyethylene glycol (meth)acrylate; and amino group-containing unsaturated monomers such as (N,N)-dimethylaminoethyl (meth)acrylate, (N,N)-dimethylaminopropyl (meth)acrylamide, and quaternary products thereof. Among them, acrylic acid or salts thereof, for example, acrylic acid of which at least a part is neutralized and/or alkali metal salts such as a sodium salt thereof may be used, and by using such monomers, a superabsorbent polymer having excellent properties can be prepared. In case the acrylic acid or alkali metal salt thereof is used as monomers, the acrylic acid may be neutralized with a basic compound such as caustic soda (NaOH) before use.

The concentration of the water-soluble ethylenically unsaturated monomers may be controlled to about 20 to about 60 wt %, or about 40 to about 50 wt %, based on the monomer composition including the above-explained raw materials and a solvent, and may be appropriately controlled considering polymerization time, reaction conditions, etc. However, if the concentration of the monomers becomes too low, yield of the superabsorbent polymer may decrease, thus causing economic problems, and if the concentration becomes too high, process problems may be generated such as precipitation of a part of the monomers or low grinding efficiency of the polymerized hydrogel polymer, etc., and the properties of the superabsorbent polymer may be deteriorated.

The monomer composition may further include an internal crosslinking agent for introducing a crosslink structure of the multi-crosslinked polymer.

As the internal crosslinking agent, any crosslinking agents known to be usable for the preparation of a superabsorbent polymer may be used. For example, the internal crosslinking agent may include one or more selected from the group consisting of a C8-12 bis(meth)acrylamide, a poly(meth)acrylate of a C2-10 polyol, and a poly(meth)allylether of a C2-10 polyol.

More specifically, as the internal crosslinking agent, one or more poly(meth)acrylates of a polyol selected from the group consisting of polyethylene glycol di(meth)acrylate, polypropyleneoxy di(meth)acrylate, glycerol diacrylate, glycerol triacrylate, and trimethylol propane triacrylate may be appropriately used. Among them, by using polyethylene glycol di(meth)acrylate, etc. as the internal crosslinking agent, a base polymer powder with an optimized internal crosslink structure may be obtained, and thereby a superabsorbent polymer fulfilling the properties of one embodiment may be more properly obtained.

The content of the internal crosslinking agent may be about 0.001 to about 2 parts by weight, preferably about 0.01 to about 1 part by weight, and more preferably about 0.1 to about 1 part by weight, based on 100 parts by weight of the water-soluble ethylenically unsaturated monomers, and when the internal crosslinking agent is included in the above range, a suitable crosslinking density may be achieved.

Further, the monomer composition may include a polymerization initiator that commonly used in the preparation of a superabsorbent polymer.

Specifically, as the polymerization initiators, a thermal polymerization initiator or a photopolymerization initiator according to UV irradiation may be used according to polymerization methods. However, even in the case of photopolymerization, since a certain amount of heat is generated by UV irradiation, etc., and heat is generated to some degree according to the progression of an exothermic polymerization reaction, a thermal polymerization initiator may be additionally included.

The photopolymerization initiator is not limited in terms of its construction, as long as it is a compound capable of forming a radical by light such as UV.

As the photopolymerization initiator, one or more selected from the group consisting of benzoin ether, dialkyl acetophenone, hydroxyl alkylketone, phenyl glyoxylate, benzyl dimethyl ketal, acyl phosphine, and α-aminoketone may be used. As a specific example of the acyl phosphine, commercially used Lucirin TPO, namely, 2,4,6-trimethyl-benzoyl-trimethyl phosphine oxide, may be used. More various photopolymerization initiators are described in Reinhold Schwalm, "UV Coatings: Basics, Recent Developments and New Applications (Elsevier 2007)", page 115, and are not limited to the above-described examples.

The photopolymerization initiator may be added in a concentration of about 0.01 to about 1.0 wt %, based on the monomer composition. If the concentration of the photopolymerization initiator is too low, the polymerization speed may become slow, and if the concentration of the polymerization initiator is too high, the molecular weight of the superabsorbent polymer may become small and the properties may become non-uniform.

Further, as the thermal polymerization initiator, at least one selected from the group consisting of a persulfate initiator, an azo initiator, hydrogen peroxide, and ascorbic acid may be used. Specific examples of the persulfate initiator may include sodium persulfate ($Na_2S_2O_8$), potassium persulfate ($K_2S_2O_8$), ammonium persulfate (($NH_4$)$_2S_2O_8$), etc., and specific examples of the azo initiator may include 2,2-azobis(2-amidinopropane)dihydrochloride, 2,2-azobis-(N,N-dimethylene)isobutyramidinedihydrochloride, 2-(carbamoylazo)isobutyronitrile, 2,2-azobis[2-(2-imidazolin-2-yl)propane]dihydrochloride, 4,4-azobis-(4-cyanovaleric acid), etc. More various thermal initiators are described in "Principles of Polymerization (Wiley, 1981)", Odian, page 203, and are not limited to the above-described examples.

The thermal polymerization initiator may be included in a concentration of about 0.001 to about 1.0 wt %, based on the monomer composition. If the concentration of the thermal polymerization initiator is too low, additional thermal polymerization may hardly occur, and thus the effect obtained by the addition of the thermal polymerization initiator may be insignificant, and if the concentration of the thermal polymerization initiator is too high, the molecular weight of the superabsorbent polymer may become small, and the properties may become non-uniform.

The monomer composition may be an acid neutralized solution, and may further include additives such as a thickener, a plasticizer, a preservation stabilizer, an antioxidant, etc., as necessary.

Meanwhile, in the method according to one embodiment, the monomer composition in which the above-explained components are dissolved in a solvent may be formed in the state of an aqueous solution or a suspension, and then crosslinking polymerization of the monomer composition is progressed in the presence of an internal crosslinking agent to form a hydrogel polymer including a multi-crosslinked polymer.

Here, the solvent that can be used is not limited in terms of its construction as long as it can dissolve or disperse the above-explained components, and for example, one or more selected from water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methylethylketone, acetone, methylamylketone, cyclohexanone, cyclopentanone, diethylene glycol monomethyl ether, diethylene glycol ethyl ether, toluene, xylene, butyrolactone, carbitol, methyl cellosolve acetate, N,N-dimethylacetamide, etc. may be used alone or in combination.

The solvent may be included in the remaining amount excluding the above-explained components, based on the total amount of the monomer composition.

Meanwhile, a method of forming a hydrogel polymer by the thermal polymerization or photopolymerization of the monomer composition is not specifically limited in terms of its construction, as long as it is a commonly used polymerization method.

Specifically, the polymerization method is largely classified into thermal polymerization and photopolymerization according to an energy source. Commonly, thermal polymerization may be progressed in a reactor equipped with a stirring axis, such as a kneader. In case thermal polymerization is progressed, it may be progressed at a temperature of 40 to 120° C.

Meanwhile, photopolymerization may be progressed in a reactor equipped with a movable conveyer belt, but the above-explained polymerization methods are no more than examples, and the present invention is not limited thereto.

The moisture content of the hydrogel polymer obtained by the above explained polymerization method may be 40 to 80 wt %. Throughout the specification, the "moisture content" is the content of moisture occupied based on the total weight of the hydrogel polymer, and it means a value obtained by subtracting the weight of a polymer of a dry state from the weight of the hydrogel polymer. Specifically, it is defined as a value calculated by measuring the weight loss according to moisture evaporation in the polymer while raising the temperature of the polymer through infrared heating to dry it. At this time, the drying condition is established such that the temperature is raised from room temperature to about 180° C. and then maintained at 180° C., and the total drying time is 40 minutes including a temperature raising step of 5 minutes.

After crosslinking polymerization of the monomers, a base polymer powder may be obtained through the processes of drying, grinding, sieving, etc., and it is appropriate for the base polymer powder and the superabsorbent polymer obtained therefrom to be prepared and provided so as to have a particle diameter of 150 to 850 μm through the processes of grinding, sieving, etc. More specifically, at least 95 wt % of the base polymer powder and the superabsorbent polymer obtained therefrom may have a particle diameter of 150 to 850 μm, and less than 3 wt % may be fine powder having a particle diameter less than 150 μm.

Since the particle diameter distributions of the base polymer powder and the superabsorbent polymer are controlled within preferable ranges, the finally prepared superabsorbent polymer may exhibit the above-explained properties and excellent absorption speed and absorption property.

The method for progressing the drying, grinding, and sieving will now be explained in more detail.

First, when drying more hydrogel polymer, if necessary, in order to increase the efficiency of a drying step, a step of coarse grinding (gel grinding) may be conducted before drying.

Here, grinders that can be used in the coarse grinding are not limited in terms of constructions, but specifically, one selected from the group consisting of a vertical pulverizer, a turbo cutter, a turbo grinder, a rotary cutter mill, a cutter mill, a disc mill, a shred crusher, a crusher, a chopper, and a disc cutter may be used, but is not limited thereto.

The coarse grinding step may be progressed such that the particle diameter of the hydrogel polymer may become about 0.1 to about 20 mm.

Grinding to a particle diameter of less than 0.1 mm would not be technically easy due to high moisture content of the hydrogel polymer, and may generate agglomeration between the ground particles. Meanwhile, if grinding to a particle diameter greater than 10 mm, the effect of increasing the efficiency of the subsequent drying step may be insignificant.

The hydrogel polymer that is coarsely ground as explained above, or the hydrogel polymer immediately after polymerization that does not pass through the coarse grinding step, is dried, and the drying temperature may be about 150 to about 250° C. If the drying temperature is less than about 150° C., a drying time may be excessively lengthened, and the properties of the finally prepared superabsorbent polymer may be deteriorated, and if the drying temperature is greater than about 250° C., only the surface of the hydrogel polymer may be dried, thus generating fine powder in the subsequent grinding process, and the properties of the finally prepared superabsorbent polymer may be deteriorated. Preferably, the drying may be progressed at a temperature of about 150 to about 200° C., and more preferably at about 160 to about 190° C.

Meanwhile, the drying may be progressed for about 20 minutes to about 90 minutes considering the process efficiency, etc., but the drying time is not limited thereto.

Further, the drying method is not limited in terms of the construction as long as it can be commonly used as a drying process of hydrogel polymer. Specifically, the drying step may be progressed by hot air supply, infrared ray irradiation, ultrahigh frequency wave irradiation, UV irradiation, etc. The polymer dried by such a method may exhibit a moisture content of about 0.1 to about 10 wt %.

Next, a step of grinding the dried polymer obtained through the drying step is conducted.

The particle diameter of the polymer powder obtained after the grinding step may be 150 to 850 μm. As a grinder for grinding to such a particle diameter, specifically, a pin mill, a hammer mill, a screw mill, a roll mill, a disc mill, a jog mill, etc. may be used, but the grinder is not limited thereto.

In order to manage the properties of the finally productized superabsorbent polymer after the grinding step, a step of sieving the polymer powder obtained after grinding according to the particle diameter may be conducted. Preferably, a polymer with a particle diameter of 150 to 850 μm may be sieved, and only the polymer powder having such particle diameter may be additionally passed through a step of surface cross-linking reaction and productized. The particle diameter distribution of the base polymer powder obtained through the process has already been explained above, so the detailed explanation thereof is omitted.

Meanwhile, after progressing the process of forming the base polymer powder, the surface of the base polymer powder may be additionally crosslinked in the presence of a surface crosslinking agent to form a surface crosslinked layer, thereby preparing the superabsorbent polymer.

That is, the method according to the present invention may further include, after the step of forming the base polymer powder, a step of heat treating the base polymer powder to progress surface crosslinking in the presence of a surface crosslinking solution.

In the surface crosslinking step, any previously known surface crosslinking agents may be used without specific limitations. Examples of the surface crosslinking agent may include one or more selected from the group consisting of polyhydric alcohol compounds, epoxy compounds, polyamine compounds, halo epoxy compounds and condensation products thereof, oxazoline-based compounds, mono-, di-, and poly-oxazolidinone compounds, cyclic urea compounds, multivalent metal salts, and alkylene carbonate compounds, and various surface crosslinking agents may be used.

During the surface crosslinking process, together with the surface crosslinking agent, multivalent metal cations may be added to progress surface crosslinking, thereby further optimizing the surface crosslink structure of the superabsorbent polymer. It is predicted that the metal cation forms chelate with the carboxyl group (COOH) of the superabsorbent polymer, thus further reducing the crosslinking distance.

The method of adding the surface crosslinking agent to the base polymer powder is not limited in terms of the construction. The surface crosslinking agent and base polymer powder may be put in a reactor and mixed, the surface crosslinking agent may be sprayed onto the base polymer powder surface, or the surface crosslinking agent and the base polymer powder may be continuously supplied to a continuously operated mixer and mixed.

When adding the surface crosslinking agent, water and methanol may be additionally mixed together and added. When water and methanol are added, it is advantageous in that the surface crosslinking agent may be uniformly dispersed in the base polymer powder. Here, the content of water and methanol added may be controlled based on 100 parts by weight of the base polymer powder, so as to induce uniform dispersion of the surface crosslinking agent, prevent agglomeration of the base polymer powder, and optimize the surface penetration depth of the crosslinking agent.

In order to prepare a superabsorbent polymer exhibiting much better properties, the surface crosslinking may be conducted at a temperature of about 110 to 200° C.

More specifically, the surface crosslinking process conditions may include a maximum reaction temperature of 140° C. or more, or 160 to 200° C., and a maintenance time at the maximum reaction temperature of 20 minutes or more, or 20 minutes to 1 hour. Further, a temperature rise time to reach the maximum reaction temperature from the temperature at the beginning of reaction, for example, about 30° C. or more, or 30 to 120° C., may be controlled to 10 minutes or more, or 10 minutes to 1 hour, and by fulfilling the above-explained surface crosslinking process conditions, the surface crosslink structure may be optimized and a superabsorbent polymer exhibiting a much better absorption property, etc., may be prepared.

A means to increase the temperature for surface crosslinking is not specifically limited. A heating medium may be supplied, or a heat source may be directly supplied and heated. Here, the kind of heating medium that can be used may include steam, hot air, a temperature-risen fluid such as hot oil, etc., but the present invention is not limited thereto, and the temperature of a supplied heating medium may be appropriately selected considering the heating medium, the temperature rise speed, and the target temperature to be reached. Meanwhile, as the directly supplied heat source, electric heating, gas heating, etc. may be mentioned, but the present invention is not limited thereto.

The superabsorbent polymer obtained according to the above preparation method of the present invention has improved centrifuge retention capacity and absorbency under pressure, and may exhibit excellent properties so as to be appropriately used in hygienic goods such as a diaper, etc.

The superabsorbent polymer prepared by the method of one embodiment as explained above may include a crosslinked polymer of water-soluble ethylenically unsaturated monomers having acid groups of which at least a part are neutralized, and plate type and rod-shaped clay that is modified by an amine-based organic compound and has an amine group introduced on the surface thereof.

Such superabsorbent polymer may exhibit an excellent absorption property wherein centrifuge retention capacity (CRC) to a saline solution (0.9 wt % sodium chloride aqueous solution) for 30 minutes is 35 to 40 g/g, 35 to 38 g/g, or 35 to 37 g/g.

The centrifuge retention capacity (CRC) to a saline solution may be measured according to the method of EDANA WSP 241.2. More specifically, the centrifuge retention capacity may be calculated by the following Formula 1, after absorbing a saline solution in a superabsorbent polymer for 30 minutes.

$$CRC\ (g/g) = \{[W_2\ (g) - W_1\ (g)]/W_0\ (g)\} - 1 \quad \text{[Formula 1]}$$

In Formula 1, $W_0$ (g) is the initial weight (g) of the superabsorbent polymer, $W_1$ (g) is the weight of an apparatus measured after draining at 250 G for 3 minutes using a centrifuge, without the superabsorbent polymer, and $W_2$ (g) is the weight of an apparatus including the superabsorbent polymer, measured after absorbing a saline solution (0.9 wt % sodium chloride aqueous solution) in the superabsorbent polymer for 30 minutes at room temperature, and then draining at 250 G for 3 minutes using a centrifuge.

The absorbency under pressure (AUP) of the superabsorbent polymer may be 22 to 30 g/g, 22 to 28 g/g, or 23 to 28 g/g. The absorbency under pressure may be measured according to the method of EDANA WSP 242.2.

Thus, the present invention can uniformly improve the properties basically required of a superabsorbent polymer such as centrifuge retention capacity, etc.

Hereinafter, the actions and effects of the invention will be explained in more detail through specific examples. However, these examples are presented only as illustrations of the invention, and the scope of the invention is not determined thereby.

Further, in the examples and comparative examples below, each property of the superabsorbent polymer was measured and evaluated by the following method.

(1) Evaluation of Particle Diameter

The particle diameters of the base polymer powder and the superabsorbent polymer used in the examples and comparative examples were measured according to the method of EDANA WSP 220.3 of the EDANA (European Disposables and Nonwovens Association) standard.

(2) Centrifuge Retention Capacity (CRC)

For the superabsorbent polymers of the examples and comparative examples, centrifuge retention capacity (CRC) of the absorption scale under no pressure was measured according to the EDANA WSP 241.3 of the EDANA (European Disposables and Nonwovens Association) standard.

Specifically, $W_0$ (g, about 0.2 g) of the polymers of the examples and comparative examples were uniformly put in an envelope made of a non-woven fabric and sealed, and then soaked in a saline solution consisting of a 0.9 wt % sodium chloride aqueous solution at room temperature. After 30 minutes, the envelope was drained at 250 G for 3 minutes using a centrifuge, and the mass $W_2$ (g) of the envelope was measured. After the same operation without using a polymer, the mass $W_1$ (g) was measured.

Using the obtained masses, CRC (g/g) was calculated according to the following Formula 1.

$$\text{CRC (g/g)} = \{[W_2 \text{ (g)} - W_1 \text{ (g)} - W_0 \text{ (g)}]/W_0 \text{ (g)}\} \qquad \text{[Formula 1]}$$

In Formula 1, $W_0$ (g) is the initial weight of the superabsorbent polymer (g), $W_1$ (g) is the weight of the apparatus without the superabsorbent polymer, measured after being soaked in a saline solution for 30 minutes, and then drained using a centrifuge at 250 G for 3 minutes, and $W_2$ (g) is the weight of the apparatus including the superabsorbent polymer, measured after the superabsorbent polymer is soaked in a saline solution at room temperature for 30 minutes, and then drained using a centrifuge at 250 G for 3 minutes.

(3) Absorbency Under Pressure (AUP)

For the superabsorbent polymers of the examples and comparative examples, absorbency under pressure was measured according to the EDANA WSP 242.3 of the EDANA (European Disposables and Nonwovens Association) standard.

First, 400 mesh wire netting made of stainless steel was installed on the bottom of a plastic cylinder with an inner diameter of 60 mm. Under the conditions of a temperature of 23±2° C. and relative humidity of 45%, $W_0$ (g, 0.90 g) of the polymers obtained in Examples 1-6 and Comparative Examples 1-3 were uniformly scattered on the wire netting, and a piston that can uniformly impart a pressure of 4.83 kPa (0.7 psi) and has an outer diameter slightly smaller than 60 mm was installed thereon without a gap with the inner wall of the cylinder such that upward and downward movement was not hindered. At this time, the weight $W_3$ (g) of the apparatus was measured.

A glass filter with a diameter of 125 mm and a thickness of 5 mm was positioned inside of a Petri dish with a diameter of 150 mm, and a saline solution consisting of 0.9 wt % sodium chloride was put to the same level as the top of the glass filter. One filter paper with a diameter of 120 mm was put thereon. The above measuring apparatus was mounted on the filter paper, and liquid was absorbed under pressure for 1 hour. After 1 hour, the measuring apparatus was raised, and the weight $W_4$ (g) was measured.

Using the obtained masses, AUP (g/g) was calculated according to Formula 2, thus confirming absorbency under pressure.

$$\text{AUP (g/g)} = [W_4 \text{ (g)} - W_3 \text{ (g)}]/W_0 \text{ (g)} \qquad \text{[Formula 2]}$$

In Formula 2, $W_0$ (g) is the initial weight (g) of the superabsorbent polymer, $W_3$ (g) is the sum of the weight of the superabsorbent polymer and the weight of the apparatus capable of imparting pressure to the superabsorbent polymer, and $W_4$ (g) is the sum of the weight of the superabsorbent polymer and the weight of the apparatus capable of imparting pressure to the superabsorbent polymer, after absorbing a saline solution in the superabsorbent polymer under pressure (0.7 psi) for 1 hour.

EXPERIMENTAL EXAMPLE

Measurement of Centrifuge Retention Capacity (CRC) and Absorbency Under Pressure (AUP)

The centrifuge retention capacity was measured according to EDANA WSP 241.2.

More specifically, the centrifuge retention capacity may be measured by the following Formula 1, after absorbing a saline solution in the superabsorbent polymer for 30 minutes.

$$\text{CRC (g/g)} = \{[W_2 \text{ (g)} - W_1 \text{ (g)}]/W_0 \text{ (g)}\} - 1 \qquad \text{[Formula 1]}$$

In Formula 1, $W_0$ (g) is the initial weight of superabsorbent polymer (g), $W_1$ (g) is the weight of the apparatus without the superabsorbent polymer, measured after soaked in a saline solution for 30 minutes, and drained using a centrifuge at 250 G for 3 minutes, and $W_2$ (g) is the weight of the apparatus including the superabsorbent polymer, measured after the superabsorbent polymer is soaked in a 0.9 wt % saline solution at room temperature for 30 minutes and absorbed, and then drained using a centrifuge at 250 G for 3 minutes.

Further, absorbency under pressure (AUP) of 0.7 psi may be measured according to EDANA WSP 242.2. More specifically, the absorbency under pressure may be calculated by the following Formula 2, after absorbing a saline solution in the superabsorbent polymer under pressure of about 0.7 psi for 1 hour.

$$\text{AUP (g/g)} = [W_4 \text{ (g)} - W_3 \text{ (g)}]/W_0 \text{ (g)} \qquad \text{[Formula 2]}$$

In Formula 2, $W_0$ (g) is the initial weight (g) of the superabsorbent polymer, $W_3$ (g) is the sum of the weight of the superabsorbent polymer and the weight of the apparatus capable of imparting pressure to the superabsorbent polymer, and $W_4$ (g) is the sum of the weight of the superabsorbent polymer and the weight of the apparatus capable of imparting pressure to the superabsorbent polymer, after absorbing a saline solution in the superabsorbent polymer under pressure (0.7 psi) for 1 hour.

Each WO (g) in Formulas 1 and 2 corresponds to the initial weight (g) of the superabsorbent polymer before absorbing a saline solution, and may be identical to or different from each other. The centrifuge retention capacity was measured by putting 0.2 g of the superabsorbent polymers of Examples 1 to 3 and Comparative Example 1 sieved to 30 to 50 mesh in a tea bag and swelling in a 0.9% saline solution for 30 minutes, removing water in a centrifuge set to 250 G for 3 minutes, and measuring the weight, thus measuring the amount of water held by the superabsorbent polymer.

Example 1

Preparation of Superabsorbent Polymer

In a reactor, 100 g of acrylic acid, 36.2 g of sodium hydroxide, 0.21 g of polyethylene glycol diacrylate (Mw=598) as a crosslinking agent, 0.008 g of diphenyl(2,4,6-trimethylbenzoyl)-phosphine oxide as a UV initiator, 0.03 g of a modified clay additive (0.03 parts by weight), and 121.5 g of water were mixed to prepare a water-soluble unsaturated monomer composition with an acrylic acid monomer concentration of 36.7 wt %.

Here, as the modified clay additive, Garamite 2578, which is a mixed product with plate and rod structures, was used. The Garamite 2578 is a commercial product of plate type and rod-shaped clay that is modified by an amine-based organic compound of a quaternary alkylammonium ion type and has an amine group introduced on the surface thereof, wherein based on 100 parts by weight of the clay before modification, 28 parts by weight of the amine-based organic compound was used to modify the clay.

Thereafter, the monomer composition was introduced through the feed section of a polymerization reactor including a continuously moving conveyer belt, and irradiated by UV through a UV irradiation device (irradiation amount: 2 mW/cm') to progress UV polymerization for 2 minutes, thus preparing a hydrogel polymer.

After transferring the hydrogel polymer to a cutter, it was cut to a size of 0.2 cm.

Subsequently, the hydrogel polymer was dried in a hot air dryer at 185° C. for 40 minutes, and the dried hydrogel polymer was ground with a pin mill grinder. Thereafter, the ground hydrogel polymer was sieved with a standard sieve of the ASTM standard to obtain a polymer (base polymer powder) with a particle size (average particle diameter) of 150 to 850 μm.

A surface crosslinking solution including 5 wt % of 1,3-propanediol and 5 wt % of propylene glycol and the remaining amount of water was sprayed onto the base polymer powder, and stirred to progress surface crosslinking at 185° C. for 90 minutes.

When the surface crosslinking reaction was completed, the finally prepared superabsorbent polymer was taken and sieved with a standard sieve of the ASTM standard to prepare a superabsorbent polymer with a particle diameter of 150 to 850 μm.

Example 2

Preparation of Superabsorbent Polymer

A superabsorbent polymer was prepared by the same method as Example 1, except that 0.05 g (0.05 parts by weight) of the modified clay additive was added to the monomer composition.

Comparative Example 1

Preparation of Superabsorbent Polymer

A superabsorbent polymer was prepared by the same method as Example 1, except that a modified clay additive was not used.

Comparative Example 2

Preparation of Superabsorbent Polymer

A superabsorbent polymer was prepared by the same method as Example 1, except that 0.05 g (0.05 parts by weight) of common platelet nanoclay (product name: Optigel CK, particle diameter 1-5 μm) was added to the monomer composition.

For the superabsorbent polymers of the examples and comparative examples, properties of CRC and AUP were measured and evaluated, and the property values are shown in the following Table 1.

Figure 2:
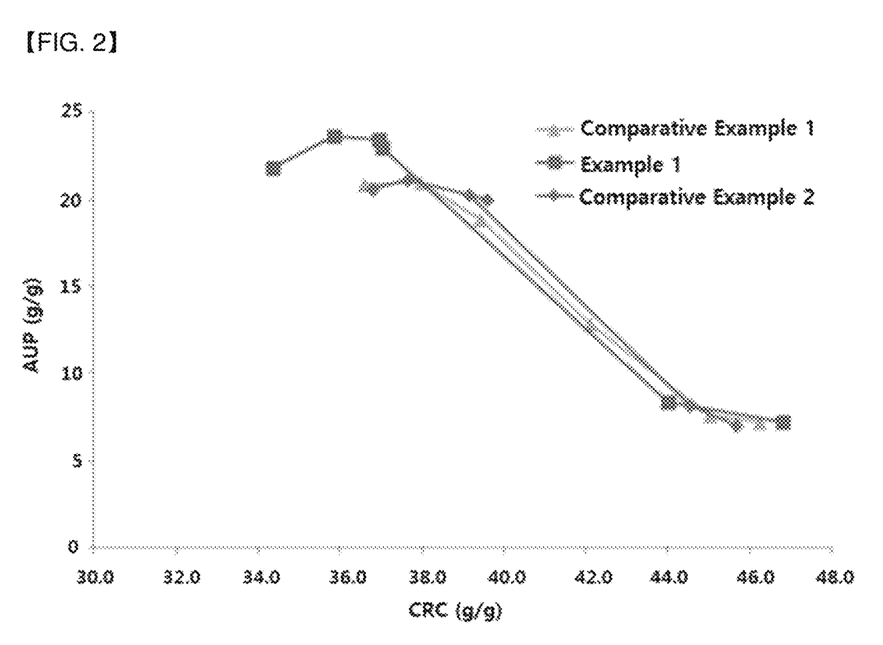
FIG. 2 comparatively shows the results of AUP to CRC of superabsorbent polymers of Comparative Examples 1 and 2 and Example 1.

The results of comparing AUP to CRC of Comparative Examples 1 and 2 and Example 1 are shown in FIG. 2.

TABLE 1

|  | CRC (g/g) | AUP (g/g) |
|---|---|---|
| Example 1 | 36.9 | 23.5 |
| Example 2 | 36.5 | 23.2 |
| Comparative Example 1 | 38.0 | 21.0 |
| Comparative Example 2 | 37.6 | 21.1 |

Referring to Tables 1 and 2, it was confirmed that compared to Comparative Examples 1 and 2, the superabsorbent polymer of Example 1 of the present invention exhibited equivalent or better basic properties, and improved AUP values. In the case of Example 2, compared to Comparative Examples 1 and 2, CRC was low, and particularly, AUP was improved.

In addition, as shown in FIG. 2, in the case of Comparative Example 2 (SAP without clay) and Comparative Example 2 (SAP with 0.05 wt % platelet clay), although centrifuge retention capacity was similar to the present invention, absorbency under pressure was lower. Further, the gel strength could not be improved.

To the contrary, the superabsorbent polymer of Example 1 as shown in FIG. 2 can improve gel strength while maximally maintaining basic absorption capacity, and thus can protect the superabsorbent polymer particles from the external pressure. That is, the superabsorbent polymer of the present invention can maintain the shape as well as have excellent basic properties, even if external pressure is generated.

What is claimed:

1. A method for preparing a superabsorbent polymer comprising:

mixing water-soluble ethylenically unsaturated monomers having acid groups of which at least a part are neutralized, an internal crosslinking agent, a polymerization initiator, and additives to prepare a monomer composition, wherein the additives comprise plate and rod-shaped clay that is modified by an amine-based organic compound and has an amine group introduced on a surface thereof;

polymerizing the monomer composition to form a hydrogel polymer comprising a multi-crosslinked polymer; and drying, grinding, and sieving the hydrogel polymer to form a base polymer powder, wherein a content of the additive is 0.03 to 5-0.05 parts by weight based on 100 parts by weight of the water-soluble ethylenically unsaturated monomers, wherein a content of the amine-based organic compound is 5 to 28 parts by weight, based on 100 parts by weight of the clay before being modified, wherein the superabsorbent polymer has absorbency under pressure (AUP) measured according to method of EDANA WSP 242.2 of 22 to 30 g/g and centrifuge retention capacity (CRC) to a saline solution (0.9 wt % sodium chloride aqueous solution) for 30 minutes of 35 to 40 g/g.

2. The method according to claim 1, wherein the amine-based organic compound is a quaternary amine compound represented by the following Chemical Formula 1:

[Chemical Formula 1]

wherein, in Chemical Formula 1, R, R', R", and R'" are each independently a C5-24 alkyl group, aryl group, or aralkyl group, which may optionally include P, O, S, or N heteroatoms, and X is a halogen atom or an alkyl sulfate.

3. The method according to claim 1, wherein the plate and rod-shaped clay includes one or more nanoparticles selected from the group consisting of montmorillonite, saponite, nontronite, laponite, beidelite, hectorite, vermiculite, magadiite, kaolin, serpentine, and mica.

4. The method according to claim 1, wherein the plate and rod-shaped clay include plate and rod-shaped clay having an average size of 0.025 to 10 μm.

5. The method according to claim 1, further comprising heat treating the base polymer powder to progress surface crosslinking in the presence of a surface crosslinking solution, after the step of forming the base polymer powder.

6. The method according to claim 1, wherein the water-soluble ethylenically unsaturated monomers include one or more selected from the group consisting of anionic monomers and salts thereof; non-ionic hydrophilic group-containing monomers; and amino group-containing unsaturated monomers.

7. The method according to claim 1, wherein the internal crosslinking agent includes one or more selected from the group consisting of a C8-12 bis(meth)acrylamide, a poly(meth)acrylate of a C2-10 polyol, and a poly(meth)allylether of a C2-10 polyol.

8. The method according to claim 1, wherein the base polymer powder is ground and sieved to a particle diameter of 150 to 850 μm.

9. A superabsorbent polymer comprising a crosslinked polymer of
water-soluble ethylenically unsaturated monomers having acid groups of which at least a part are neutralized, and
a plate and rod-shaped clay that is modified by an amine-based organic compound and has an amine group introduced on a surface thereof,
wherein AUP measured according to method of EDANA WSP 242.2 is 22 to 30 g/g and
wherein centrifuge retention capacity (CRC) to a saline solution (0.9 wt % sodium chloride aqueous solution) for 30 minutes is 35 to 40 g/g.

10. The superabsorbent polymer according to claim 9, wherein a particle diameter thereof of the superabsorbent polymer is 150 to 850 μm.

11. The superabsorbent polymer according to claim 9, wherein the plate and rod-shaped clay include one or more nanoparticles selected from the group consisting of montmorillonite, saponite, nontronite, laponite, beidelite, hectorite, vermiculite, magadiite, kaolin, serpentine, and mica.

12. The superabsorbent polymer according to claim 9, wherein the water-soluble ethylenically unsaturated monomers include one or more selected from the group consisting of anionic monomers and salts thereof; non-ionic hydrophilic group-containing monomers; and amino group-containing unsaturated monomers.

13. The method of claim 1, wherein the multi-crosslinked polymer includes a structure, wherein functional groups of the acrylic acid monomers and functional groups derived from the plate and rod-shaped clay are randomly chemically crosslinked.

14. The method of claim 1, wherein the water-soluble ethylenically unsaturated monomers are acrylic monomers.

15. The method of claim 6, wherein the anionic monomers are one or more of acrylic acid, methacrylic acid, maleic anhydride, fumaric acid, crotonic acid, itaconic acid, 2-acryloylethane sulfonic acid, 2-methacryloylethane sulfonic acid, 2-(meth)acryloylpropane sulfonic acid, or 2-(meth)acrylamide-2-methyl propane sulfonic acid;
wherein the non-ionic hydrophilic group-containing monomers are one or more of (meth)acrylamide, N-substituted (meth)acrylate, 2-hydroxyethyl (meth)acrylate, 2-hydroxypropyl (meth)acrylate, methoxy polyethylene glycol (meth)acrylate, or polyethylene glycol (meth)acrylate; and
wherein the amino group-containing unsaturated monomers are one or more of (N,N)-dimethylaminoethyl (meth)acrylate, (N,N)-dimethylaminopropyl (meth)acrylamide, or quaternary products thereof.

16. The method of claim 12, wherein the anionic monomers are one or more of acrylic acid, methacrylic acid, maleic anhydride, fumaric acid, crotonic acid, itaconic acid, 2-acryloylethane sulfonic acid, 2-methacryloylethane sulfonic acid, 2-(meth)acryloylpropane sulfonic acid, or 2-(meth)acrylamide-2-methyl propane sulfonic acid;
wherein the non-ionic hydrophilic group-containing monomers are one or more of (meth)acrylamide, N-substituted (meth)acrylate, 2-hydroxyethyl (meth)acrylate, 2-hydroxypropyl (meth)acrylate, methoxy polyethylene glycol (meth)acrylate, or polyethylene glycol (meth)acrylate; and
wherein the amino group-containing unsaturated monomers are one or more of (N,N)-dimethylaminoethyl (meth)acrylate, (N,N)-dimethylaminopropyl (meth)acrylamide, or quaternary products thereof.

* * * * *